United States Patent
Carbone et al.

(10) Patent No.: US 8,598,456 B2
(45) Date of Patent: Dec. 3, 2013

(54) COVER AND HINGE ASSEMBLY FOR ELECTRICAL DEVICE

(75) Inventors: Christopher A. Carbone, Newtown, CT (US); David L. Lutz, Woodbridge, CT (US); Thomas McLean, Milford, CT (US)

(73) Assignee: Hubbell Incorporated, Shelton, CT (US)

( * ) Notice: Subject to any disclaimer, the term of this patent is extended or adjusted under 35 U.S.C. 154(b) by 148 days.

(21) Appl. No.: 13/156,761

(22) Filed: Jun. 9, 2011

(65) Prior Publication Data

US 2012/0312577 A1     Dec. 13, 2012

(51) Int. Cl.
*H02G 3/14*     (2006.01)
(52) U.S. Cl.
USPC ................................. 174/66; 174/67; 220/241
(58) Field of Classification Search
USPC ................................. 174/66, 67; 220/241, 242
See application file for complete search history.

(56) References Cited

U.S. PATENT DOCUMENTS

| | | | |
|---|---|---|---|
| 4,784,610 A | 11/1988 | Stuart | |
| 4,914,781 A | 4/1990 | Sokn et al. | |
| 4,979,634 A * | 12/1990 | Begley | 220/242 |
| 5,501,607 A | 3/1996 | Yoshioka et al. | |
| 5,517,724 A | 5/1996 | Beneke | |
| 5,743,752 A | 4/1998 | Massebeuf | |
| 6,035,490 A | 3/2000 | Jones et al. | |
| 7,201,590 B1 | 4/2007 | Chen | |
| 7,799,993 B2 * | 9/2010 | Drane et al. | 174/67 |
| 7,915,528 B2 * | 3/2011 | Ni | 174/53 |

* cited by examiner

*Primary Examiner* — Dhirubhai R Patel
(74) *Attorney, Agent, or Firm* — Garrett V. Davis; Mark S. Bicks; Alfred N. Goodman

(57) ABSTRACT

A cover assembly includes a base, a cover and a hinge coupling the cover to the hinge. The hinge includes a body coupled to a rear face of the base and extends outwardly from a side edge of the base. The hinge has a leg oriented to contact an edge of the cover when the cover is pivoted to the open position. The edge frictionally engages the leg of the hinge to hold the cover in an open position and limit rotation of the cover.

22 Claims, 7 Drawing Sheets

COVER AND HINGE ASSEMBLY FOR ELECTRICAL DEVICE

FIELD OF THE INVENTION

The present invention is directed to a cover and hinge assembly. In particular, the invention is directed to a cover assembly for use with electrical outlets or connectors where the cover has a hinge that limits the pivotal movement of the cover and holds the cover in an open position. The cover assembly is particularly suitable for use in wet locations and for RV and marine use.

BACKGROUND OF THE INVENTION

Electrical connectors have been constructed for various uses and environments. The connectors used for outside use typically have a cover that can be removed or opened to access the connector. Connectors for marine use can have a hinged cover that pivots to an open position so that a cable or plug can be connected to the connector. The cover is designed to close over the connector when not in use to prevent water for entering the connector. The connector is typically accessible through an opening or inlet in the marine hull with the closing in the inlet when not in use.

The connectors can have a hinged cover that must be pivoted open a sufficient amount so that the cable or plug can be coupled to the connector. Spring biased covers can be difficult to use since the cover often interferes with the cable or plug while attempting to make the connection.

Various covers for electrical connectors have been constructed for integrally formed hinges or separate hinges that are attached to the cover and housing. One example of a hinge assembly is shown in U.S. Pat. No. 4,914,781 to Sokn et al., which relates to a hinge assembly for a closure such as a washing machine. The hinge includes a U-shaped recess that allows the edge of the cover to pivot. The surface of the recess includes a landing to hold the cover in the open position.

U.S. Pat. No. 4,784,610 to Stuart discloses an electrical connector having a hinged cover. The hinged cover includes a coil spring for pivoting the cover to the closed position.

U.S. Pat. No. 5,501,607 to Yoshioka et al. discloses a waterproof structure for a charging connector. The connector has a hinged cover with a substantially U-shaped spring as shown in FIG. 2. The hinge portion of the cover includes flat surfaces that engage the leg of the spring to hold the cover in selected positions.

U.S. Pat. No. 5,517,724 to Beneke discloses a hinge intended for use in a piece of furniture. The hinge includes a base attached to the furniture and a door pivotally connected to the hinge. The hinge includes a side piece having a flat surface that defines a stop for limiting movement of the door with respect to the hinge and the furniture.

U.S. Pat. No. 5,743,752 to Massebeuf discloses a waterproof electrical connection having a hinged cover. The housing includes a hinge having a pivot hole for receiving a hinge pin and connecting the cover to the housing. The housing also includes an inclined wall forming a stop member to limit rotational movement of the cover.

U.S. Pat. No. 6,035,490 to Jones et al. discloses a cover hinge with a detent for use in the cover of an electrophotographic printing machine. The hinge is disclosed as a planar member having a plurality of bends extending the width of the hinge. The hinge includes a planar portion, a first inclined leg extending from the base and a second inclined leg extending from the first leg. The second leg includes a round channel for receiving a hinge pin. The first leg includes a detent extending outwardly from the surface thereof for engaging the cover and limiting the pivoting movement of the cover with respect to the hinge.

U.S. Pat. No. 7,201,590 to Chen discloses a water-resistant electrical connector assembly. The connector includes a base as shown in FIG. 1 and a hinged cover. A hinge pin with a coil spring surrounding the hinge pin connects the cover to the base and pivots the cover to the closed position.

While these hinges have generally been suitable for the intended purpose, there is a continuing need in the industry for an improved hinge assembly for exterior use.

SUMMARY OF THE INVENTION

The present invention is directed to a cover assembly for use with an electrical wiring device. The invention is particularly directed to a cover assembly having a hinge that can limit the movement of the cover and can hold the cover in an open position and close by gravity when released.

The cover assembly of the invention is particularly adapted for use with electrical connectors for RV, marine use and other outdoor or wet locations that require a cover to close and seal the electrical connector when not in use. Accordingly, a primary feature of the invention is to provide a cover assembly that is suitable for exterior use to provide a weatherproof enclosure for an electrical connector. In one embodiment, the cover assembly is adapted for use in marine environments to be mounted on the outer surface of a marine hull. The cover assembly is coupled to the outer surface of the hull and the electrical component extends through an opening in the hull to the interior of the hull. In another embodiment, the cover assembly is adapted for use with an electrical connector in a recreational vehicle (RV) such as for connecting the RV to a power source.

Another feature of the invention is to provide a cover assembly having a hinge member as a separate component that is attached to a hinge base and the cover. The hinge is fixed to the base and pivotally connects the cover to the base and limits the pivoting movement of the cover to prevent the cover from contacting the support surface. The cover assembly also includes at least one member to engage the cover to hold the cover in the open position.

The invention is directed to a cover assembly having a hinge that is coupled to the base and the cover. The hinge can be fixed to the base and pivotally connected to the cover. Alternatively, the hinge can be fixed to the cover and pivotally connected to the base. The hinge has a surface that cooperates with the cover or the base when the cover is open and frictionally engages the cover or base to hold the cover in an open position and limit movement between the cover and the base.

The cover assembly of the invention includes a base for mounting to a support surface and for supporting the electrical device such as a connector. The support surface has an opening for receiving or accessing the electrical device. The base is mounted to an outer surface of the support surface so that the electrical device is mounted within the opening of the support surface. A cover is hinged to the base to close the opening in the base and cover the electrical device.

The cover has a dimension to surround and enclose the base when the cover is closed. The hinge member is positioned between the base and the cover so that the hinge is also enclosed by the cover when the cover is closed.

The hinge of the present invention is made of a metal such as a spring metal that is cut and stamped to the desired shape. In one embodiment, the hinge has one end fixed to the base and a second end that is hinged to the cover. The hinge includes a plurality of surfaces for engaging the cover to hold the cover in an open position and to limit travel of the cover with respect to the base.

In one embodiment of the invention, the hinge has a body portion attached to the base, a plurality of legs and a connecting portion on each leg for pivotally connecting to the cover. The legs can have a first leg portion connected to the body portion and second leg portion extending between the first leg portion and the connecting portion. One of the leg portions is oriented to engage an edge of the cover when the cover is opened to hold the cover in the open position. The leg portion can be a flat surface so that the cover contacts the leg portion at an incline to frictionally engage the leg to hold the cover in the open position. The leg can also include a recess to engage the edge of the cover or a protruding member to engage the cover to hold the cover open.

These and other aspects of the invention are attained by providing a hinged cover assembly for an electrical device comprising a base having a top face, bottom face and an opening for receiving an electrical device and enabling access to the electrical device. A cover is provided having a dimension to enclose the base and opening. A hinge has a first end coupled to the base and second end pivotally coupled to the cover. The hinge has a first surface for frictionally engaging a first surface on the cover to hold the cover in an open position and a second surface to limit rotation of the cover with respect to the hinge and base.

The various aspects of the invention are further attained by providing a cover assembly for an electrical device comprising a base having an opening for receiving an electrical device. The base has a top face and a bottom face for mounting to a support surface. A hinge is provided having a first end and a second end, and at least two transverse bends between the first and second ends defining a first leg and a second leg. A cover is provided having a top wall and a side wall for encircling the top wall. The side wall has a hinge portion coupled to the second leg of the hinge. The side wall has a first edge contacting the first leg to hold the cover in an open position and a second edge for engaging the second leg to limit rotation of the cover.

The features of the invention are also attained by providing a hinged cover assembly comprising a base having a top surface and a bottom surface and an opening for receiving an electrical device. A hinge is coupled to the bottom surface of the base. The hinge has a body portion, a first leg with a first end coupled to the body portion and a second end, and a second leg with a first end coupled to the second end of the first leg and a second end. A cover is pivotally coupled to the second end of the second leg. The cover has a top wall and a side wall with an edge oriented for contacting the first leg to hold the cover in an open position.

These and other aspects of the invention will become apparent from the following detailed description of the invention which, in conjunction with the annexed drawings, disclose various embodiments of the invention.

BRIEF DESCRIPTION OF THE DRAWINGS

The following is a brief description of the drawings, in which.

DETAILED DESCRIPTION OF THE INVENTION

The present invention is directed to a cover assembly for use with an electrical wiring device for outdoor use. In one embodiment, the cover assembly of the invention is particularly adapted for marine use to provide a weatherproof cover for the electrical component.

Figure 1:
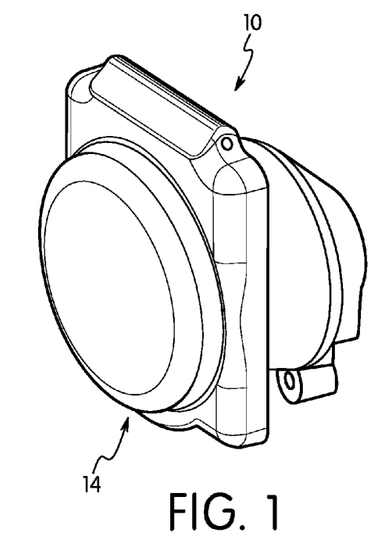
FIG. 1 is a perspective view of the cover assembly in one embodiment of the invention.
Figure 2:
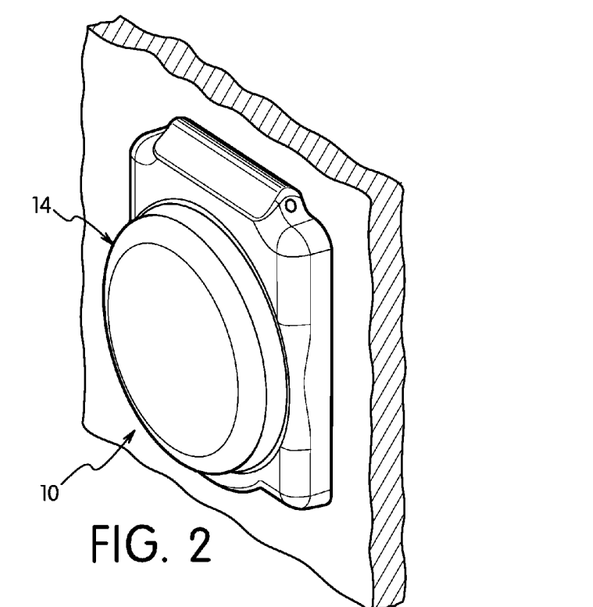
FIG. 2 is a perspective view of the cover assembly mounted to a support surface.
Figure 3:
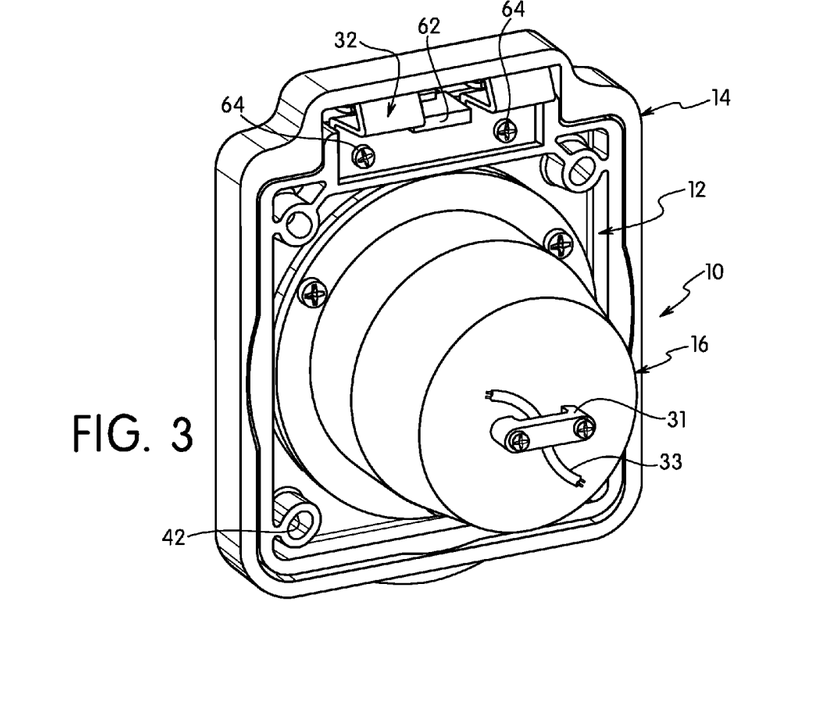
FIG. 3 is a rear view of the cover assembly and electrical device.

The invention as shown in the drawings is directed to a cover assembly 10 having a base 12 and a cover 14. The cover assembly 10 is adapted for use with an electrical device 16 as shown in FIGS. 1 and 3. The electrical device 16 can be a variety of electrical wiring devices such as plugs, receptacles, switches or sensors. The cover assembly is particularly adapted for mounting to a support surface 18 as shown in FIG. 2. The support surface 18 includes an opening (not shown) for receiving the electrical device 16 so that the electrical device 16 is mounted behind the front surface of the support structure. The cover assembly 10 is mounted directly to the support surface so that the base 12 lies against the support surface. The support surface can be a marine hull or outer wall of a boat or RV.

Figure 4:
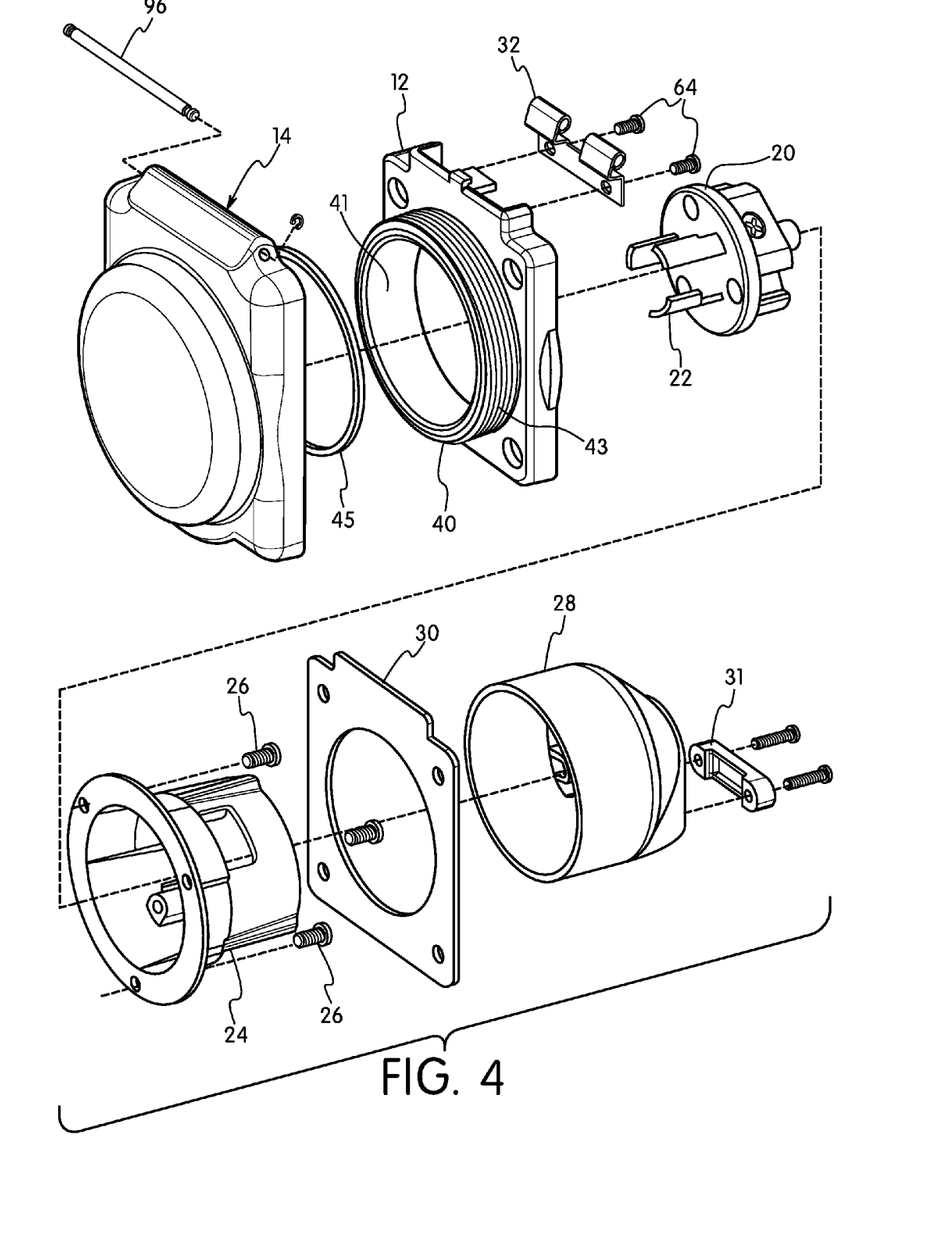
FIG. 4 is an exploded view of the cover assembly and electrical device of FIG. 3.

In one embodiment shown in FIG. 4, the electrical device 16 is a plug 20 having a plurality of prongs 22. The plug 20 is mounted to an inner housing 24 which is attached to the rear face of the base 12 by screws 26. An outer protective housing 28 is attached to the inner housing 24 to enclose the electrical device. A gasket 30 is provided to form a weatherproof seal between the base 12 and the support surface 18. A strain relief clamp 31 is coupled to the housing 28 to clamp the electric cord 33 connected to the plug 20.

The cover 14 is connected to the base 12 by a hinge 32. The hinge 32 is formed as a separate component that is attached to the base 12 and the cover 14 to hinge the cover to pivot between an open and closed position.

Figure 5:
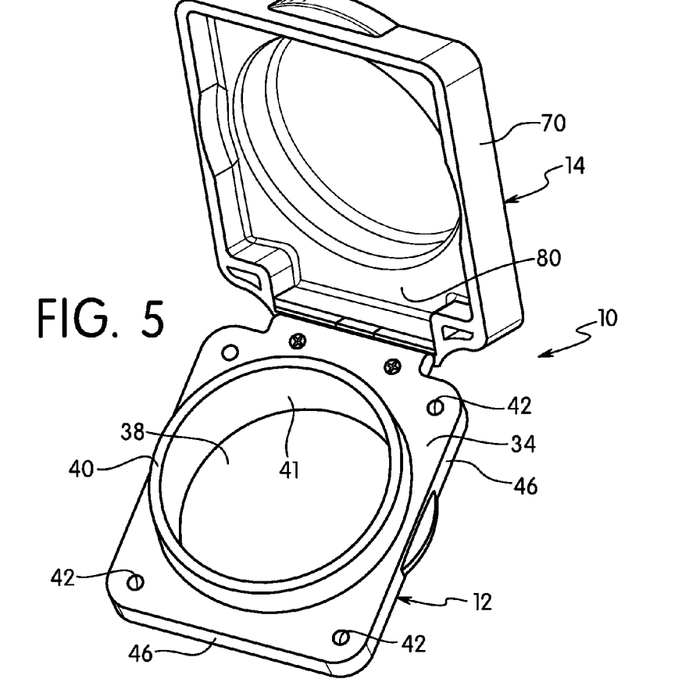
FIG. 5 is a top perspective view of the cover assembly showing the cover in the open position.

Base 12 in the embodiment shown has a substantially square configuration with a top face 34 and a bottom face 36. In other embodiments, the base 12 can be round, rectangular or another shape. Top face 34 as shown in FIG. 5 has a flat surface with an opening 38 for receiving the electrical device 16. A collar 40 surrounds the opening 38 and extends upwardly from the top face 34 to encircle the opening 38 and form a shield to prevent water from entering the opening 38 and for mating with the cover and for mating with the cover 14. Screw holes 42 are provided for receiving mounting screws for mounting the base 12 to the support surface 18. Collar 40 preferably has external threads 43 for coupling with an internally threaded coupling of an electrical cable as known in the art. A gasket 45 is provided on the inner face of cover 14 to seal the open end of collar 40. The opening has a dimension to enable access to the electrical component 16. The electrical component 16 can be coupled to the rear face of the base. In one embodiment, the electrical component can have a portion or outer face that is received within the opening. Typically, the electrical component is spaced below the top edge of the collar 40.

Figure 6:
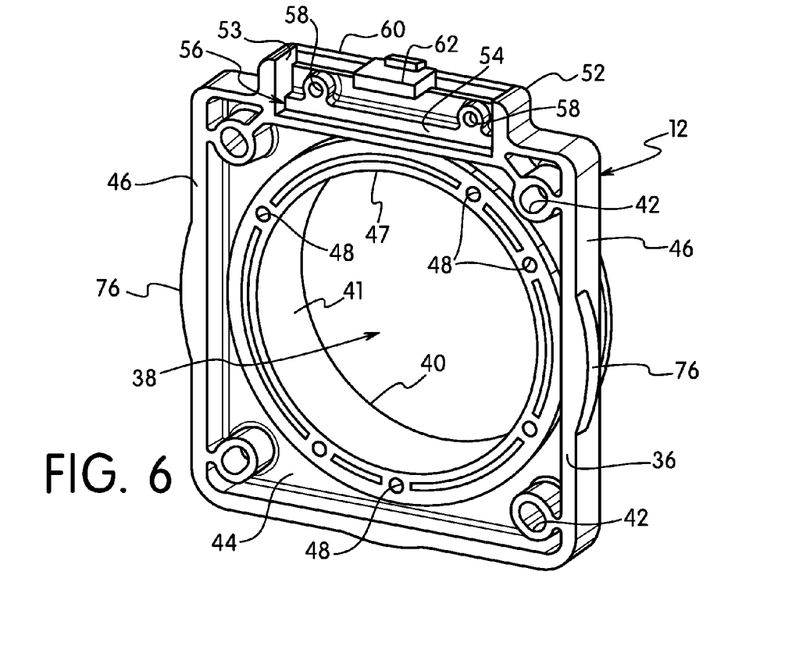
FIG. 6 is a rear view of the base of the cover assembly.

Referring to FIGS. 3 and 6, the bottom face 36 of base 12 has a recessed area 44 formed by a downwardly extending outer side wall 46 and an annular ring 47 surrounding the opening 38 and forming an inner wall. The bottom face of annular ring 47 is provided with a plurality of screw holes 48 for receiving screws 50 to attach the electrical device 16 to the bottom face 36 with the electrical device mounted in or below the opening 38. The annular ring 47 and the collar 40 are oriented to form a continuous annular inner wall surface 41 of the opening 38.

Base 12 includes a hinge portion 52 extending outwardly from the side wall 46 for accommodating the hinge 32. As shown in FIG. 6, the hinge portion 52 extends outwardly from the side wall 46 parallel to the plane of the base 12. A shoulder 54 is provided in the hinge portion 52 to define a recess 56. The shoulder 54 is spaced upwardly from the bottom face 36 of side wall 46 and includes screw holes 58 for mounting the hinge 32 to the base. The outer end 53 of the hinge portion 52 forms an open end as shown in FIG. 6. A top wall 60 of the hinge portion 52 has a downwardly extending tab 62 that is centrally located in the open end.

In the embodiment shown in FIG. 3, the hinge 32 is mounted to the hinge portion by screws 64 so that the hinge sits within the recess 56 so as not to interfere with the base lying flat against the support surface. The hinge 32 in the embodiment shown is fixed to the base and the cover 14 pivots on the hinge. The gasket 30 as shown in FIG. 4 has a shape corresponding to the shape of base 12. The gasket 30 has an opening 31 corresponding to the opening 38 in the base 12 as shown in FIG. 1. The gasket 30 preferably forms a seal between the support surface 18 and the bottom surface of the outer wall 46 and the bottom surface of the annular ring 47.

Figures 7, 8, 9, 10, 10A, 11:
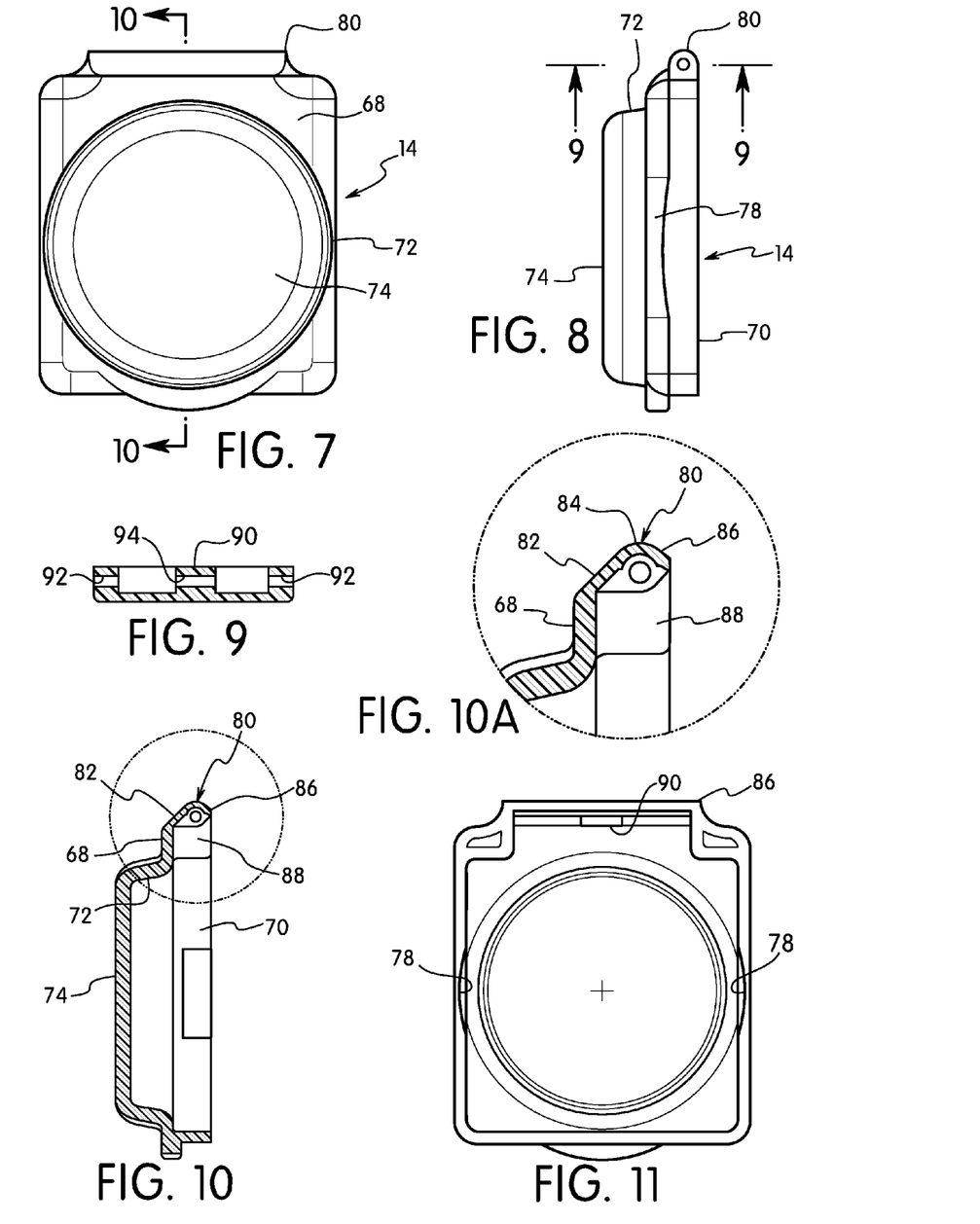
FIG. 7 is a front view of the cover assembly.
FIG. 8 is a side view of the cover of the cover assembly.
FIG. 9 is a cross-sectional view of the cover taken along line 9-9 of FIG. 8.
FIG. 10 is a cross-sectional view of the cover taken along line 10-10 of FIG. 8.
FIG. 10A is an enlarged view of the hinge portion of the cover.
FIG. 11 is a rear view of the cover of FIG. 7.

Cover 14 as shown in FIGS. 7-11 has a substantially square configuration corresponding to the shape of base 12. Cover 14 has a top wall 68 and a downwardly extending side wall 70 with a dimension for encircling the cover. A collar 72 extends upwardly from the top wall 68 as shown in FIG. 10 to accommodate the electrical device and the collar 40 of the base 12. A top portion of collar 72 overlies the collar 40 of the base 12 to provide a sealed enclosure. The side wall 70 preferably has a dimension to mate with the side wall 46 of base 12 as shown in FIG. 3 to enclose the base 12. The opposite side walls of base 12 have outwardly extending convex projections 76 that mate with concave recesses 78 in opposite side walls 70 of the cover 14 as shown in FIG. 3.

Cover 14 has a hinge portion 80 aligned with the hinge portion 52 of base 12. Hinge portion 80 of cover 14 has a top wall 82, side walls 84, and an end wall 86. Top wall 82, side walls 84 and end wall 86 define a cavity 88. Cavity 88 has a dimension corresponding substantially to the hinge portion 52 of base 12. Hinge portion 80 has a centrally located tab 90 as shown in FIG. 9. Side walls 84 of hinge portion 80 include a hole 92 that is aligned with a hole 94 in tab 90 for receiving a hinge pin 96. The hinge pin 96 extends through the hinge 32 and the holes 92 and 94 for coupling the cover to the base.

The base 12 and cover 14 can be made of a suitable rigid material such as plastic or metal. In one embodiment of the invention, the cover assembly 12 is made of a corrosion resistant metal.

Hinge 32 in a first embodiment of the invention is shown in FIGS. 12-15. Hinge 32 is made from metal and is bent to the desired shape by stamping, pressing and rolling. Preferably, hinge 32 is made from a spring steel. Hinge 32 has a body portion 100 with the bottom edge forming a first end 102, a top edge forming a second end 104 and opposite side edges 106. Screw holes 108 are provided in the body 100 for receiving the screw 64 to attach the hinge 32 to the base 12. Preferably, body portion 100 has a flat planar configuration.

Figure 12:
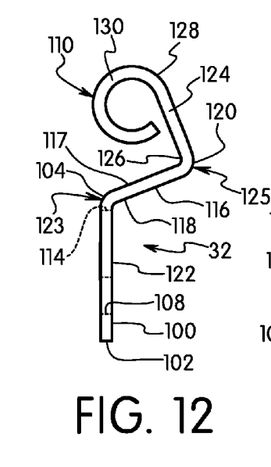
FIG. 12 is a side view of the hinge member of the cover assembly.
Figure 13:
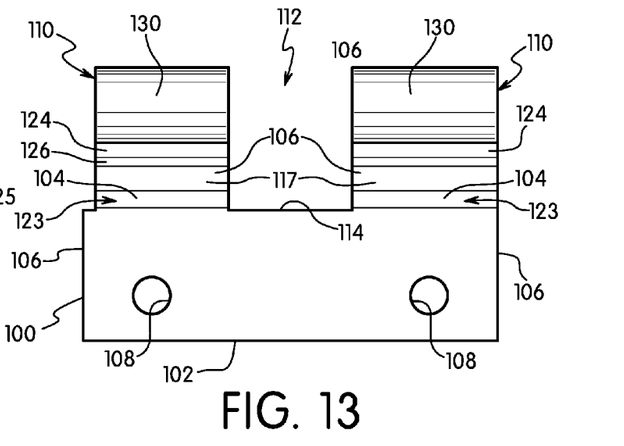
FIG. 13 is a front view of the hinge of FIG. 12.

In the embodiment illustrated, hinge 32 includes two spaced apart hinge members 110 connected to the top edge 104 of body portion 100. In other embodiments, a single hinge member can be provided. The hinge members 110 are spaced apart to form a gap 112 therebetween and a notched portion 114 in body portion 100. Each hinge member 110 includes a first leg 116 with a first surface 117 having a first end 118 coupled to the top edge 104 of body portion 100 at a first bend 123 and a second outer end 120. First leg 116 extends from the body portion at an inclined angle outwardly from a front side 122 of body portion 100. First leg 116 as shown in FIG. 12 extends at an obtuse angle from front side 122 at a first bend 123. A second leg 124 has a first end 126 connected to the second end 120 of body portion 100 and first leg 116 at a second bend 125. In the embodiment illustrated, second leg 124 extends upwardly from first leg 116 at an angle of substantially 90°.

Second leg 124 has a second outer end 128 connected to a circular hinge portion forming a loop 130 that is curved inwardly towards body 100. Circular portion 130 has a dimension for receiving the hinge pin 96 for connecting cover 14 to hinge 32.

As shown in FIG. 3, hinge 32 is coupled to the shoulder 54 of hinge portion 52 by screws 64. The tab 62 extends through the notch 114 in hinge 32 to locate the hinge within the recess 56 of the hinge portion 52. The body 100 of hinge 32 fits within the recess 56 of hinge portion 52 and is recessed with respect to the bottom face 36 of base 12.

Figure 14:
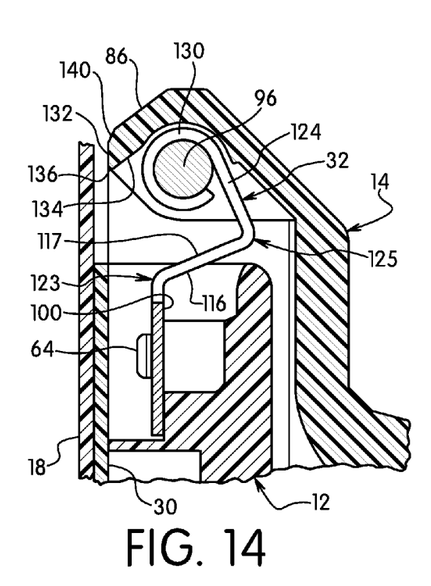
FIG. 14 is a partial cross-sectional view of the hinge connected to the hinge assembly.
Figure 15:
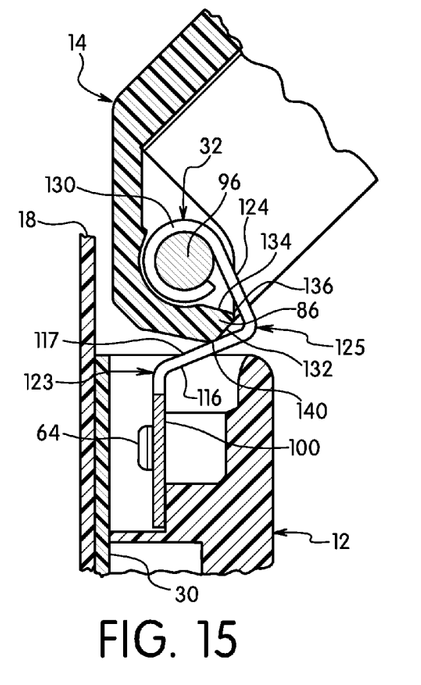
FIG. 15 is a partial cross-sectional view showing the cover in the open position.
Figure 16:
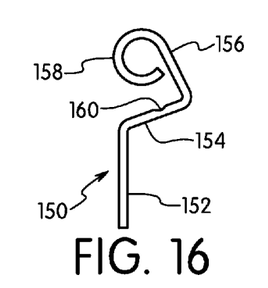
FIG. 16 is a side view of a hinge member in a second embodiment of the invention.
Figure 17:
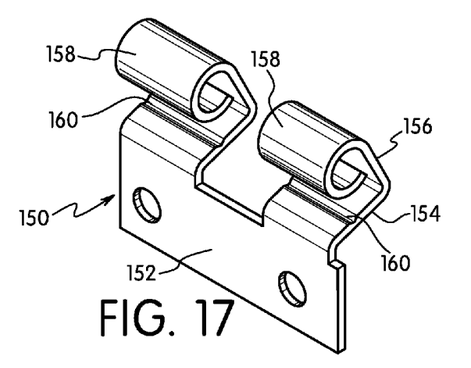
FIG. 17 is a perspective view of the hinge assembly of FIG. 16.

A shown in FIGS. 14 and 15, hinge 32 is attached to base 12 with the first leg 116 extending toward top face 34 of base 12. Cover 14 is positioned onto the base and hinge and coupled to the hinge by the hinge pin 96. As shown in FIG. 14, hinge 32 is completely enclosed within the cover 14 when cover 14 is closed on the base and is spaced outwardly from the outer wall 46 of base 12. The hinge 32 is positioned outwardly from the seal formed by the gasket between the support surface and the bottom surface of the base.

Referring to FIGS. 14 and 15, end wall 86 of hinge portion 80 of cover 14 is inclined with respect to the plane of cover 14 and extends in an inward direction from top wall 82 with respect to cover 14. As shown in FIG. 14, end wall 86 is angled so that the top wall 82 and side wall 84 of hinge portion 80 partially surround the circular portion 130 of hinge 32. End wall 86 has an end face 132 formed at an incline with respect to the plane of end wall 86. As shown in FIG. 14, end face 132 lies in a plane substantially parallel to the plane of base 12 when cover 14 is in the closed position. End face 132 forms an acute angle with the inner face of end wall 86 to form an inner edge 136. End face 132 forms an obtuse angle with respect to an outer face of end wall 86 to define an outer edge 140.

End face 132 of end wall 86 is oriented to cooperate with the first leg 116 of hinge 32 when the cover is pivoted to the open position as shown in FIG. 15. The outer edge 140 of end face 132 pivots into engagement with the first leg 116 at an inclined angle to form a friction fit to hold the cover 14 in the open position as shown in FIG. 15. The spring steel of hinge 32 enables a friction fit with the cover. Preferably, the first leg 116 engages the outer edge 140 with sufficient force to hold cover 116 in an open position while allowing manual separation of the outer edge from the first leg 116 by pivoting the cover to the closed position. The end face 132 can engage the second leg 124 to limit the pivotable movement of the cover with respect to the hinge and the base. Preferably, the end face 132 is oriented with respect to the hinge to prevent the cover from being pivoted into contact with the support surface.

In the embodiment shown, cover 14 is closed by gravity onto the base 12 and retained in the closed position by a snap connection or interference fit with the base 12. The hinge limits the pivotable movement of the cover and holds the cover in the open position to allow access to the electrical device. The cover is manually pivoted to separate the edge of the cover from the leg of the hinge, thereby allowing the cover to close. In the embodiment shown, hinge 32 is fixed to the base 12 and the cover 14 pivots with respect to the hinge 32 and the base 12. In alternative embodiments, the hinge can be fixed to the cover so that the cover and the hinge pivot with respect to the base about a hinge pin.

Figure 21:
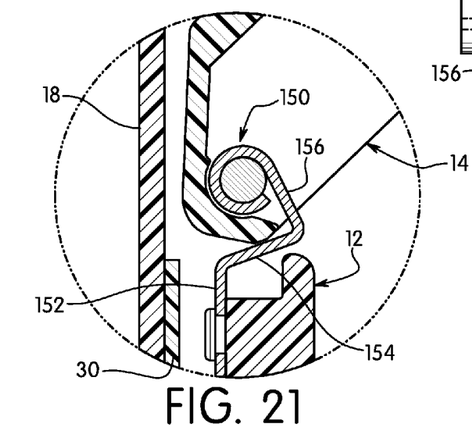
FIG. 21 is a partial cross-sectional view of the hinge assembly of FIG. 16.

In a second embodiment of the invention, the cover assembly includes a hinge 150 to couple the base 12 and cover 14 together as shown in FIG. 21. Hinge 150 is similar to hinge 32 and includes a body 152, a first inclined leg 154, a second leg 156 and a circular loop 158 connected to the second leg for receiving the hinge pin.

Figure 18:
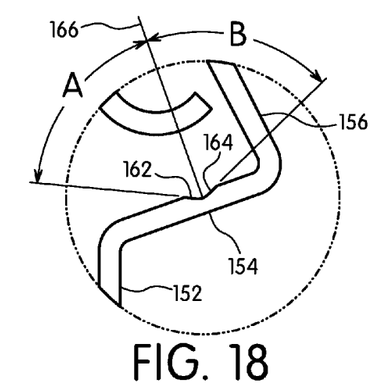
FIG. 18 is an enlarged partial side view of the hinge assembly of FIG. 16.
Figure 19:
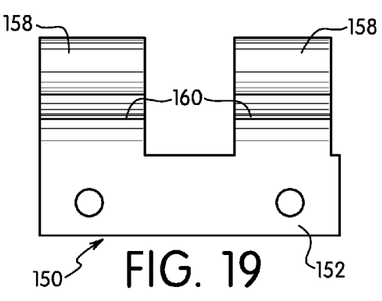
FIG. 19 is a front view of the hinge assembly of FIG. 16.
Figure 20:
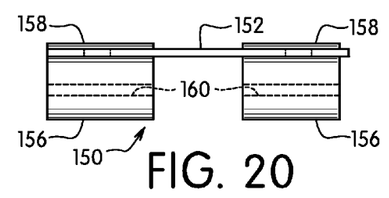
FIG. 20 is a top view of the hinge assembly of FIG. 20.

In the embodiment of FIGS. 16-21, the first leg 154 includes a substantially V-shaped groove 160 extending transversely across each leg. As shown in FIG. 18, V-shaped groove 160 has two converging inclined surfaces. The inner inclined surface 162 is formed at a first angle A and an outer inclined surface 64 formed at an angle B with respect to a line 166 perpendicular to the plane of the leg 154. In one embodiment, angle B is less than angle B with respect to the plane of the first leg 154. In the embodiment shown in FIG. 18, angle A is 59° with respect to the line 166 perpendicular to the plane of first leg 54 and angle B is 71° with respect to the perpendicular line 166.

As shown in FIG. 21, the V-shaped groove is oriented to receive the outer edge 140 of the cover to hold the cover in the open position. In one embodiment, the angled surfaces of the V-shaped groove 160 complement the angle of the edge 140 of end face of the end wall 86 of the hinge portion 80 of the cover. The V-shaped groove receives the outer edge to hold the cover in the open position and limit rotational movement of the cover with respect to the hinge and the base.

Figure 22:
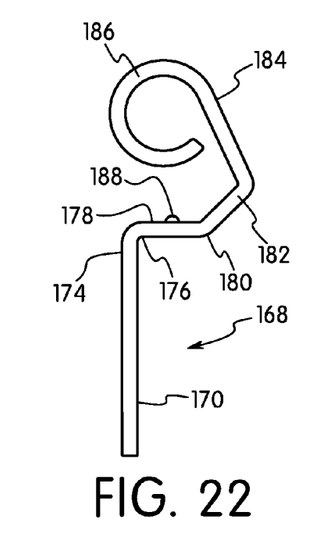
FIG. 22 is an end view of a hinge in a third embodiment of the invention.
Figure 23:
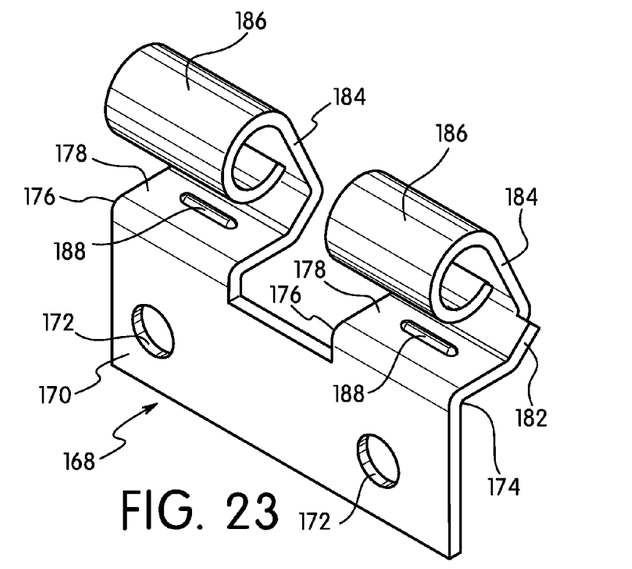
FIG. 23 is a perspective view of the hinge of FIG. 22.
Figure 24:
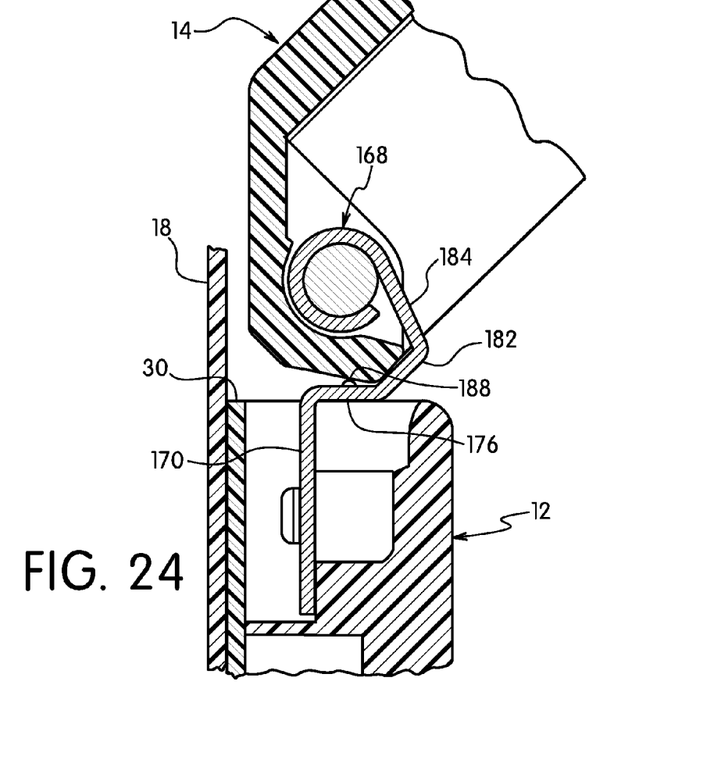
FIG. 24 is a partial cross-sectional view of the cover assembly and hinge of FIG. 21.

In another embodiment shown in FIGS. 22-24, a hinge 168 is provided to couple the cover 14 to the base 12. Hinge 168 includes a body 170 having screw holes 172 where the body 170 has a dimension to fit within the recess of the hinge portion of the base as in the previous embodiments. The body 170 has a top edge 174 connected to a first end 176 of a first leg 178. As shown in FIG. 22, first leg 178 extends substantially parallel to body 170.

First leg 178 has a second end 180 connected to a second leg 182 extending at an incline with respect to the plane of first leg 178. Second leg 182 is connected to a third leg 184 that extends at an inclined angle with respect to the plane of the body 170 and extends in a direction toward the body 170. In the embodiment illustrated, second leg 182 is substantially perpendicular to third leg 184. Third leg 184 includes a circular loop 186 for receiving the hinge pin as in the previous embodiments.

As shown in FIGS. 22 and 23, each first leg 178 includes a projecting detent 188 having a longitudinal dimension extending transversely with respect to the first leg 178. Detent 188 is positioned to engage the outer edge 140 of the cover as shown in FIG. 24. The outer edge of the cover slides over the detent 188 to hold the cover in the open position. As in the previous embodiments, the outer edge of the hinge portion of the cover frictionally engages the leg to assist in holding the cover in the open position and limiting pivoting movement of the cover with respect to the hinge and the base to prevent the cover from contacting the support surface. The inner edge of the hinge portion is also positioned to contact the third leg to limit pivoting movement of the cover.

While various embodiments have been chosen to illustrate the features of the invention, it will be understood by those skilled in the art that various changes and modifications can be made without departing from the scope of the invention as defined in the appended claims.

What is claimed is:

1. A hinged cover assembly for an electrical device comprising:
    a base having a top face, bottom face and an opening extending between said top face and bottom face for enabling access to the electrical device;
    a cover having a dimension to close said opening in said base; and
    a hinge having a body portion coupled to said base and said hinge having a first leg for frictionally engaging an outer edge of said cover to hold said cover in an open position and a second leg to limit rotation of said cover with respect to said hinge and base, said cover being pivotally coupled to said second leg.

2. The hinged cover assembly of claim 1, wherein
    said cover has a top wall and a depending side wall with a dimension to surround said base; and
    said hinge has a circular portion at said second leg for receiving a hinge pin, said circular portion being positioned between said base and said side wall of said cover.

3. The hinged cover assembly of claim 2, wherein said side wall of said cover has a hinge portion with an end wall extending inwardly with respect to said cover.

4. The hinged cover assembly of claim 3, wherein said inwardly extending end wall has an outer edge of said cover for frictionally engaging said first leg of said hinge.

5. The hinged cover assembly of claim 1, wherein said first leg of said hinge has a groove to engage said first surface on said cover when said cover is in an open position.

6. The hinged cover assembly of claim 1, wherein said first leg of said hinge has a projecting detent to engage said outer edge of said cover when said cover is in the open position.

7. The hinged cover assembly of claim 1, wherein said hinge is coupled to said bottom face of said base.

8. The hinged cover assembly of claim 1, wherein
said cover has a hinge portion having an end wall with an outer face and an inner face and an inclined end face extending between said inner and outer face, said outer face and inclined end face forming a corner defining said outer edge on said cover.

9. The hinged cover assembly of claim 8, wherein
said inner face and inclined end face forming a corner therebetween engaging said second leg of said hinge.

10. The hinged cover assembly of claim 1, wherein
said first leg extending from said body portion at an incline with respect to said body portion and extending toward said top face of said base; and
said second leg extending from an end of said first leg at an incline with respect to said first leg, and said cover being pivotally coupled to said second leg.

11. A cover assembly for an electrical device comprising:
a base having an opening extending between a top face and a bottom face for accessing an electrical device, said base configured for mounting to a support surface for supporting said cover assembly;
a hinge having a body portion with a first end and a second end opposite said first end, and at least two bends defining a first leg and a second leg; and
a cover having a top wall and a side wall extending from said top wall, said side wall having a hinge portion coupled to said second leg of said hinge, said hinge portion having an end wall having an outer edge contacting said first leg to hold said cover in an open position and an inner edge for engaging said second leg to limit rotation of said cover.

12. The cover assembly of claim 11, wherein
said first leg has a recess therein for receiving said first outer edge of said cover to hold said cover in an open position.

13. The cover assembly of claim 12, wherein
said first leg has a projecting detent for engaging said first edge of said cover.

14. The cover assembly of claim 11, wherein
said body portion is coupled to said bottom face of said base, said first leg of said hinge being coupled to an end of said body portion and extending in a direction toward said top face of said base.

15. The cover assembly of claim 14, wherein
said first leg extends at an incline with respect to said body portion, and said second leg extends at an incline with respect to said first leg.

16. The cover assembly of claim 14, wherein
said first leg is substantially perpendicular to said body, and said second leg is at an incline with respect to said first leg.

17. The cover assembly of claim 11, wherein
said side wall of said cover has a hinge portion on an outer surface, an inner surface and an inclined end surface extending therebetween, said outer surface and end surface forming said first edge and said outer surface and end surface forming said second edge.

18. A hinged cover assembly comprising:
a base having a top face and a bottom face and an opening extending between said top face and bottom face for accessing an electrical device;
a hinge having a body portion coupled to said bottom face of said base, said hinge having a first leg with a first end coupled to said body portion and a second end, a second leg with a first end coupled to said second end of said first leg and a second end; and
a cover pivotally coupled to said second end of said second leg, said cover having a top wall and a side wall with an edge oriented for contacting said first leg to hold said cover in an open position.

19. The hinged cover assembly of claim 18, wherein
said cover has a hinge portion extending outwardly from said side wall, said hinge portion having a top wall and side wall extending at an incline inwardly toward a center of said cover, said side forming said edge for engaging said first leg of said hinge.

20. The hinged cover assembly of claim 19, wherein
said side wall of said hinge portion of said cover having an outer surface, an inner surface and an inclined end face extending between said inner and outer surface, said outer surface and end face merging at said edge forming an obtuse angle, and said inner surface and end face merging to an inner edge forming an acute angle.

21. The hinged cover assembly of claim 19, wherein
said base has a hinge portion complementing said hinge portion of said cover, said hinge portion of said base having a bottom surface with a recessed area receiving said body portion of said hinge.

22. The hinged cover assembly of claim 21, wherein
said side wall of said cover has a bottom surface that lies in the same plane of said bottom surface of said base when said cover is in the closed position.

* * * * *